P. VANDE SANDE.
Meat and Vegetable Cutter.
No. 83,676. Patented Nov. 3, 1868.
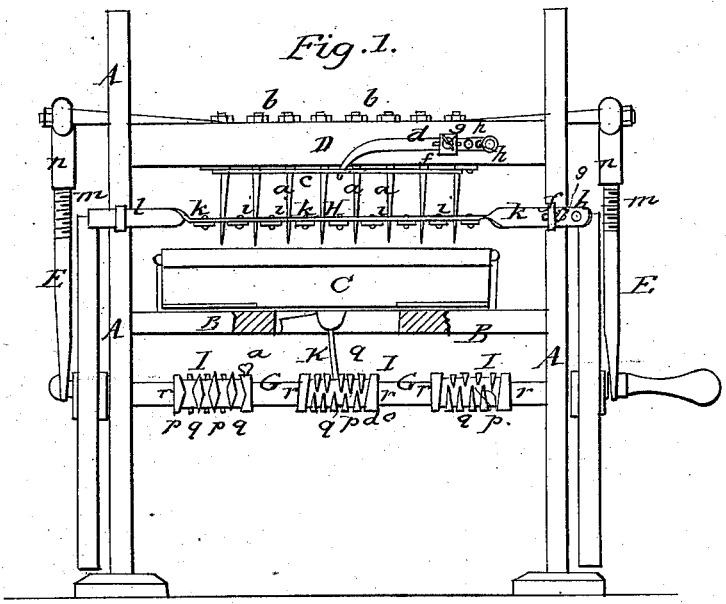

United States Patent Office.

PETER VANDE SANDE, OF ROCHESTER, NEW YORK, ASSIGNOR TO HIMSELF AND STEPHEN COLEMAN, OF SAME PLACE.

*Letters Patent No. 83,676, dated November 3, 1868.*

IMPROVED MACHINE FOR CUTTING MEAT AND OTHER ARTICLES.

The Schedule referred to in these Letters Patent and making part of the same.

*To all whom it may concern:*

Be it known that I, PETER VANDE SANDE, assignor to myself and STEPHEN COLEMAN, both of Rochester, in the county of Monroe, and State of New York, have invented a certain new and useful Improvement in Machines for Cutting Meat and Other Materials; and I do hereby declare that the following is a full and exact description thereof, reference being had to the accompanying drawings, making part of this specification, in which—

Figure 1 is a front elevation, and

Figures 2 and 3, detail views, showing the arrangement of the knives and clearers.

Like letters of reference indicate corresponding parts in all the figures.

My invention consists essentially in the arrangement of the knives and clearers, and in the method of operating the meat-box.

In the drawings, A indicates the frame, having a stationary bed, B, on which rests the meat-box C, and having also a vertically-acting gate, D, which receives motion, through pitmen E E, from double-crank shaft G. The gate is armed with vertical knives $a\ a$, set at regular distances apart, and turning upon pivots $b\ b$, by which means they may be adjusted to any angle, as indicated in red lines, fig. 2. On one side of the gate, the knives are jointed to a bar, $c$, to which is attached a rod, $d$, passing through an eye, $f$, with a pin, $g$, that fits in any one of a series of adjusting-holes, $h$. By this means, the position of the knives is changed at one action.

Beneath the knives, and between them and the meat-box, is a flexible rack, H, made up of clearers or cross-bars, $i\ i$, pivoted at opposite ends to straps $k\ k$, supported by the opposite sides or standards of the frame, as clearly shown in fig. 1. The opposite angular corners, $l\ l$, adjust longitudinally by the same devices, $f\ g\ h$, as the parts above, so as to set the clearers at angles to correspond with the knives, as indicated by the red lines, fig. 3.

The meat or other material, being placed in box C, is fed along first in one direction, and then the other, and the knives, striking down through the spaces between the clearers to the bottom of the box, cut it up finely in the passage. When the knives pass up in the upward stroke, the clearers or bars $i\ i$ sweep them clean, and thus prevent any clogging or obstruction. When the meat has been sufficiently cut in a straight line, the knives and clearers are set at any corresponding angle, and secured there, as indicated by red lines, figs. 2 and 3, which cross-cuts the contents of the box. By this means, the meat may be reduced to any desired degree of fineness, with but little labor. The flexibility or yieldingness of the rack H will allow the perfect action of the knives in both directions, for if any impediment comes between the gate and rack, the latter will yet yield sufficiently to allow the knives to complete their stroke, and therefore the machine will not be stopped.

This arrangement of the knives and clearers, capable of adjusting to different positions, forms an essential feature in my invention, and the same I believe to be new.

In order to make the knives cut deeper or shallower in the box, I make the pitman-rods E E adjustable in length by screws $m$ and sockets $n$.

On the crank-shaft G is situated a series of collars, I I I, adjustable to different positions, and secured to the shaft by set-screws $o$. These collars are cut with screw-threads of different degrees of coarseness, and of peculiar arrangement.

The threads are cut or divided longitudinally of the collar, on two opposite sides, as shown at $p$, and the sections, $q\ q$, of said threads are made of diamond or double-wedging form, and the several points of the two sets break joints, or alternate in position, as clearly shown in fig. 1; that is, the points of one set come opposite the openings of the other set. At the extremities of the screw-threads, the ends of the collars are formed into two cams, $r\ r$, whose inclinations are parallel, as clearly indicated in fig. 1.

The upper end of a thread-plate, K, fits loosely into the bottom of the meat-box, so as to have a free turning motion in its socket. The lower end has two forks, $s\ s$, which stride the collar, and work like a nut between the screw-threads.

The action is as follows: In leaving the screw-threads of one section, the thread-plate strikes into the screw-threads of the other section, and thus moves forward, carrying the meat-box till it reaches the end, when cam $r$ sets the thread-plate in the opposite direction, and it feeds back in the same manner, thus making the action of the meat-box continuous and reciprocating under the knives. Whenever it is desirable to feed faster or slower, the screw-collar is moved out of place, and another with a different thread substituted. The loose connection of the box with the thread-plate allows the parts to be separated at once.

This arrangement of the divided screw, whereby the thread-plate can alternately reciprocate, I believe to be original with myself, and also the arrangement of a series of the collars, with the threads of different degrees of coarseness, whereby one may be replaced by another.

What I claim as my invention, and desire to secure by Letters Patent, is—

1. The combination of the knives $a\ a$ and clearers $i\ i$, having an angular adjustment, and otherwise arranged as described, and operating in the manner and for the purpose specified.

2. Constructing the rack H in such a manner as to have a degree of flexibility, as herein described.

3. The arrangement of the divided screw-threads, $q$ $q$, upon the collar I, in such a manner as to alternate in position when combined with the thread-plate K, in the manner and for the purpose specified.

4. The combination of the cams $r$ $r$ with the screw-threads $q$ $q$ and thread-plate K, operating in the manner and for the purpose specified.

5. The arrangement of a series of the collars, I I I, upon the same shaft, and having screw-threads of different degrees of coarseness, whereby one may be substituted for another, as described.

6. The arrangement, as a whole, consisting of knives $a$ $a$, rack H, box O, thread-plate K, and screw-collars I, operating as described.

In witness whereof, I have hereunto signed my name, in the presence of two subscribing witnesses.

PETER VANDE SANDE.

Witnesses:
R. F. OSGOOD,
J. A. DAVIS.